United States Patent [19]

Chenot et al.

[11] 4,426,600
[45] Jan. 17, 1984

[54] STANDARD WHITE FLUORESCENT LAMPS EMPLOYING BLEND

[75] Inventors: Charles F. Chenot, Towanda, Pa.; Wolfgang Walter, Brookline, Mass.

[73] Assignee: GTE Products Corporation, Stamford, Conn.

[21] Appl. No.: 51,303

[22] Filed: Jun. 22, 1979

Related U.S. Application Data

[63] Continuation-in-part of Ser. No. 830,796, Sep. 6, 1977, abandoned.

[51] Int. Cl.$^3$ ............................................. H01J 61/44
[52] U.S. Cl. ...................................................... 313/487
[58] Field of Search ......................................... 313/487

[56] References Cited

U.S. PATENT DOCUMENTS

| | | | |
|---|---|---|---|
| 2,488,733 | 11/1949 | McKeag et al. | 252/301.4 |
| 2,965,786 | 12/1960 | Aia et al. | 313/487 |
| 3,513,103 | 5/1970 | Shaffer | 252/301.4 |
| 3,549,552 | 12/1970 | Broekhoven | 252/301.4 |
| 3,670,194 | 6/1972 | Thornton et al. | 252/301.4 P |
| 4,038,204 | 7/1977 | Wachtel | 252/301.4 P |
| 4,075,532 | 2/1978 | Piper et al. | 252/301.4 P |

FOREIGN PATENT DOCUMENTS 956451 10/1974 Canada.

OTHER PUBLICATIONS

Walter, "Optimum Phosphor Blends for Fluorescent Lamps;" Applied Optics, vol. 10, pp. 1108–1113; May, 1971.

*Primary Examiner*—David K. Moore
*Attorney, Agent, or Firm*—Donald R. Castle

[57] ABSTRACT

A fluorescent lamps having colors similar to standard white can be prepared using two phosphor compositions. A blue emitting phosphor having a peak emission with a specified range and a 50% band width within a specified range is used with specific amounts of a yellow-emitting phosphor having a 50% band width within a specified range and a peak emission within a specified range provide a lamp having the same chromaticity as a standard white lamp with a higher lumer per watt than the standard white lamp. In one embodiment the blue emitting component has a second specific peak emission and a specific 50% bandwidth.

3 Claims, 3 Drawing Figures

STANDARD WHITE FLUORESCENT LAMPS EMPLOYING BLEND

CROSS REFERENCE TO RELATED APPLICATIONS

This application is a continuation-in-part of Ser. No. 830,796 filed Sept. 6, 1977 and now abandoned.

U.S. Pat. application Ser. No. 830,791, filed Sept. 6, 1977, assigned to the same assignee as the present application discloses and claims a lamp containing a two-component blend which has improved results in higher lumens per watt than a standard cool white lamp.

BACKGROUND OF THE INVENTION

This invention relates to standard white fluorescent lamps and to two component phosphor blends incorporated therein. More particularly, it relates to standard white lamps that contain a two component blend and, as a result, yield higher lumens per watt with a suitable color rendition than proir standard white lamps.

The color characteristics of light emitted from a fluorescent lamp depends on the choice of phosphors used to coat the internal walls of lamp envelope. Emission spectra of luminescence centers in most phosphors consist of a single band peak at one particular wavelength. Therefore, in order to have white light it is necessary to either apply a mixture of phosphors or use a single phosphor containing more than one kind of luminescent center (such as the alkaline earth halophosphates). It is not enough to obtain the desired chromaticity coordinates and there are an infinite number of possible combinations of bands that would result in the same set of coordinates. It is also necessary that the lamp produce an acceptable luminous flux (brightness) and satisfactory optimum color rendition for all regions of the visible spectrum.

There are four standard lamps used today, daylight, cool white, white, and warm white and the desired chromaticity coordinates for these lamps are given hereinafter.

While it is possible to determine by theoretical computations the spectral energy distribution for a theoretical blue component and a theoretical yellow component that upon being blended together will yield a lamp having either brightness or color rendition maximized, such theory has to be tailored to the restraints as they exist in nature. In theory, a combination of a line emitting blue component and a line emitting yellow component would yield a lamp having the maximum brightness. Such a lamp however, cannot be produced for a number of reasons. First, phosphors having a line emission do not exist. Secondly, even if they existed the color rendition would be extremely poor because only two colors would be emitted and would result in color distortion in the area lighted by the lamp. Until recently the primary emphasis was placed upon color rendition with a suitable brightness. The single component halophosphates having two luminescent centers have been used to produce the aforementioned four white colors. The energy shortage, however, has shifted the emphasis to maximize lumens per watt of energy with an acceptable color rendition enabling a lower energy input to achieve the same level of brightness. While in theory, a two-component blend can produce warm white, there is no known binary combination of lumiphors that will yield that color, however, it has been discovered that binary blends can be made which will produce the other three colors.

It is believed, therefore, that a two-component phosphor system that takes into account the variables of brightness, color rendition and the lumiphors that exist in nature which when blended together will result in emitting light that corresponds to one of the white colors and which maximizes the lumens per watt of energy input for the particular lamp that is desired is an advancement in the art.

OBJECTS AND SUMMARY OF THE INVENTION

It is an object of this invention to provide a lamp employing a two-component blend that emits light similar to the standard white, however, such a lamp has a higher lumen per watt output than present standard white lamps.

In accordance with this invention lamps which use less energy to yield comparable brightness than the standard white lamps yet have suitable color rendition are achieved by utilizing a specific two-component phosphor system that consists essentially of a first component having a specific peak emission in the yellow region and a specific band width, and a second component having a specific peak emission in the blue region with a specific band width. The foregoing parameters of peak emission and band width for the two-component system and the ratio of the first to second component are specific for the standard white lamp.

For a better understanding of the present invention, together with other and further objects, advantages and capabilities thereof, reference is made to the following disclosure and appended claims in connection with the above-described drawings.

DETAILS OF THE PREFERRED EMBODIMENTS

The chromaticity coordinates for the standard lamps are as follows:

| Lamp | X | Y |
|---|---|---|
| Daylight | 0.313 | 0.337 |
| Cool White | 0.372 | 0.375 |
| White | 0.409 | 0.394 |
| Warm White | 0.440 | 0.403 |

In theory, the binary blends which would yield the maximum brightness are represented in the following table and as previously reported by Walter, one of the inventors of this invention in *Applied Optics*, Vol. 10, page 1108, (1971)."

| Lamp | % Blue Component In The Blend | Line Emission Blue | Line Emission Yellow |
|---|---|---|---|
| Daylight | 29.1% | 444 | 567.6 |
| Cool White | 19.0% | 444 | 573.5 |
| White | 13.5% | 444 | 576.7 |
| Warm White | 9.7% | 444 | 579.6 |

As previously mentioned phosphors having line emission do not exist in nature and lamps employing such phosphors (even if they did exist) would not yield a color rendition acceptable for most purposes. It is necessary that phosohor having a band emission be used and into the color rendering index, as defined in the aforementioned article, should be at least about 45.

Also it is possible to calculate the theoretical two-component system that would yield a lamp having a suitable color rendition and brightness. These theoretical systems are given in the table below.

|  | Daylight | Cool White | White | Warm White |
|---|---|---|---|---|
| BLUE | | | | |
| Peak (Nanometers) | 486 | 507 | 522 | 537 |
| 50% Bandwidth (Nanometers) | 111 | 121 | 128 | 135 |
| YELLOW | | | | |
| Peak (Nanometers) | 601.0 | 606.8 | 611.7 | 614.4 |
| 50% Bandwidth (Nanometers) | 85 | 44 | 44 | 44 |
| % of Yellow Component | 60.9% | 63.5% | 60.5% | 58.8% |

These data were also reported in Applied Optics, supra. In that article an arithmetic mean of the brightness index and the color rendering index was assumed. It has been found, however, that a CRI of from 45 to 50 is satisfactory for some major purposes where color is not the prime consideration. Such purposes include lighting in warehouses, garages, tunnels, corridors, etc..

Standard white color is defined as a color having x and y color coordinates of 0.409 and 0.394 respectively. The lighting industry has accepted a somewhat broader definition as being any light source that falls within a relatively small oval having the aforementioned coordinates at its center as is shown by 20 in FIG. 2. The x values for standard white can vary from about 0.405 to about 0.415 and the y values can vary from about 0.390 to about 0.405.

The particular phosphors chosen have to have color coordinates such that when the compensation for the mercury emission is made, the x and y coordinates are such that a line connecting each of them will pass through the standard white oval.

Figure 2:
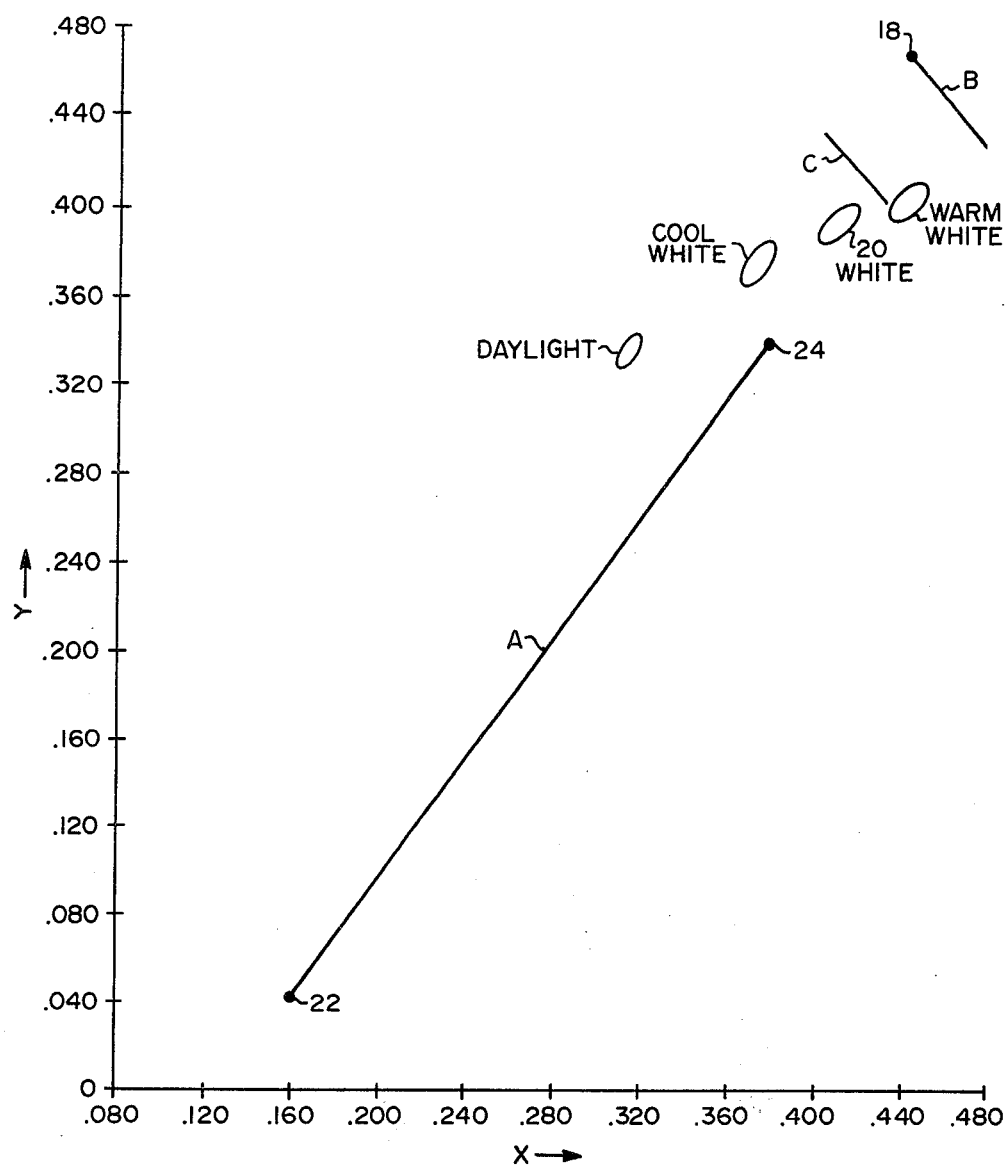
FIG. 2 is a portion of the CIE chromaticity diagram containing information concerning the present invention.

With particular reference to FIG. 2, a phosphor having the formula $Sr_{5-x}Eu_xCl(PO_4)_3$ wherein x is from about 0.005 to 0.15 has x and y color coordinates shown at point 22. Dual activated compositions represented by the formula $$Sr_{5-x-y}Eu_xMn_y Cl(PO_4)_3$$

wherein x is from about 0.005 to about 0.15 and y is from 0 to about 0.25 have x and y color coordinates that fall along line A in FIG. 2.

Increasing the manganese content, as expressed in the foregoing formula, from 0 to 0.25 causes an increase in x and y color coordinates so that the emission falls along line A. The chromacity for such a phosphor containing the maximum amount of manganese is illustrated at point 24 in FIG. 2.

Figure 1:
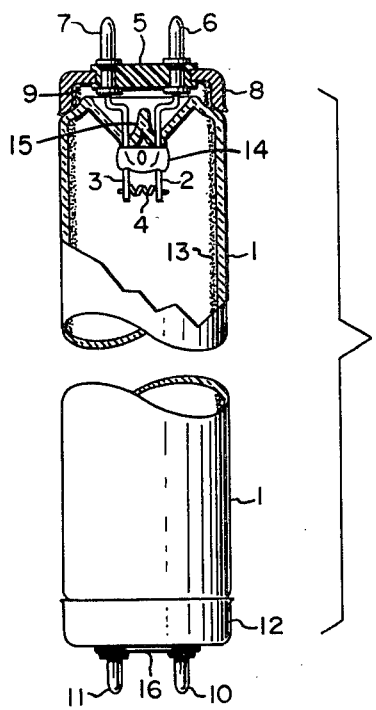
FIG. 1 is a fluorescent lamp having the phosphor system of this invention deposited as a coating on the internal surfaces of the lamp envelope.
Figure 3:
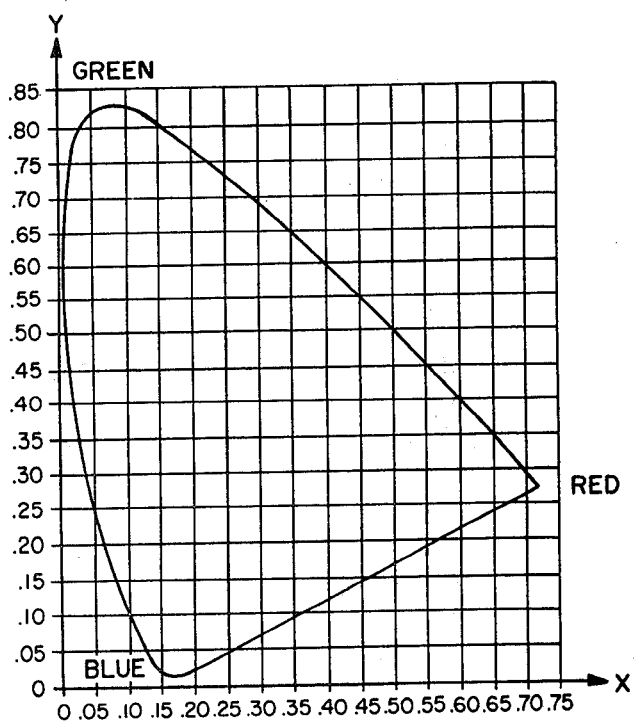
FIG. 3 is a reproduction of the CIE chromaticity diagram.

Compositions represented by the formula, $$Ca_{5-w-x-y}Cd_wMn_xSb_y(PO_4)_3F_{1-y-a}Cl_aO_y$$

wherein
w is from 0 to about 0.05
x is from about 0 to about 0.17
y is from about 0.02 to about 0.04
a is from 0 to about 0.1
have been found to have emissions that fall along line B in FIG. 1. The composition represented by the formula $$Ca_{4.775} Cd_{0.037} Mn_{0.157} Sb_{0.031} (PO_4)_3 F_{0.969}O_{0.031}$$

has an emission represented by point 18 in FIG. 2. As the chlorine content increases from 0 to about 0.1 the x value increases and the y value decreases along line B. When the emission of these phosphors is combined with the emission characteristics of the mercury in a standard fluorescent lamp, the combined emission falls along line C in FIG. 2.

As can be appreciated there are only a limited number of compositions that can be combined to fall within the standard white oval 20. The present invention employs from about 2 to about 35% by weight of the blue emitting phosphor that has either a single peak at from about 440 to about 450 nanometers and a 50% bandwidth of from about 25 to about 65 nanometers or a two emission peaks, the first at about 440 to about 450 nanometers and the second at from about 580 to about 610 nanometers and 50% bandwidth of from about 50 to about 100 nanometers. Such materials fall along line A in FIG. 2 and are further defined by the formula: $Sr_{5-x-y}Eu_xMn_yCl(PO_4)_3$ wherein x is from about 0.005 to about 0.15 and y is from about 0 to about 0.25.

These materials can be used with yellow emitting compositions of the general formula $Ca_{5-w-x-y}Cd_wMn_xSb_y(PO_4)_3F_{1-y-a}Cl_aO_y$ as previously described, however, the value for a in the foregoing formula is from about 0.02 to about 0.1. A higher or lower chlorine content causes a color shift of such a significant amount that it cannot be matched with a blue emitting material that will produce a blend that has a color falling within the white oval 20.

These particular yellow emitting materials useful in the present invention have a peak emission of from about 565 to about 575 nanometers and a 50% bandwidth of from about 60 to about 100 nanometers.

The lamps produced containing the two component blends as previously described have a higher lumen per watt than the prior art standard white which employed a single phosphor namely a calcium chlorofluorapatite activated with antimony and manganese.

The blue emitting phosphor material can be prepared by the procedures taught in U.S. Pat. No. 3,513,103 incorporated by reference herein and assigned to the same assignee as the present invention. The yellow emitting component can be prepared by the conventional methods previously used to manufacture the conventional cool white halophosphate.

With particular reference to FIG. 1, the sealed glass envelope 1 has the lead-in wires 2, 3, sealed through one of its ends and corresponding lead-in wires sealed through the The amount of the relative components that are use will depend upon whether a blend in the sense of the uniform admixture is utilized or whether a uniform distribution of two distinct layers are used. In the event two distinct layers are used, the amount of the inner layer will be decreases from the amount that is used in a blend. As is appreciated in the art if two phosphors having the same efficiency were utilized the amount of each phosphor that would be used when a blend is employed would be in the inverse relationship to the respective distances between the cool white target and the x and y coordinates of each of the individual phosphors when plotted on the CIE diagram. Thus in the practice of the present invention when a blend is employed from about the present invention when a blend is employed from about 2 to about 15% of the blue emitting phosphor is required with the efficiencies of phosphors. If a two-layer approach is used the amounts of the inner layer would be decreased from that required in a blend, that is, if the blue emitting material is used as the inner layer, the amount required is reduced by as much as 90 percent of that required in a blend, a similar reduction achieved if the yellow-emitting phosphor is used as the inner layer. Thus in practice of the present invention from about 0.2% to about 70% of the total phosphor utilized can be the blue emitting compound, that is the europium barium manganesium aluminate and the balance is the yellow emitting phosphor.

While there has been shown and described what are at present considered the preferred embodiments of the invention, it will be obvious to those skilled in the art that various changes and modifications may be made therein without departing from the scope of the invention as defined by the appended claims.

What is claimed is:

1. A fluorescent lamp comprising a sealed envelope, eletrodes therein, a filling of inert gas, and a mercury therein, and a coating of phosphor on the inside surface of said envelope, characterized in that said phosphor consists essentially of a blend exhibiting x and y color coordinates equivalent to standard white of from about 405 to about 415 and from about 390 to about 405 respectively, said blend consisting essentially of from about 10 to about 35 weight percent of a blue emitting phosphor having the formula $Sr_{5-x-y}Eu_xMn_y(PO_4)_3Cl_2$ wherein x is from about 0.005 to about 0.15 and y is from 0 to about 0.25, said blue emitting phosphor having a first peak emission of from about 440 to about 450 nanometers and a 50% bandwidth of from about 25 to about 65 nanometers and if y is greater than 0, a second peak emission of from about 580 to 610 and a 50% bandwidth of about 50 to 100 nanometers and the balance being a yellow emitting phosphor composition having the formula, $$Ca_{5-w-x-y}Cd_wMn_xSb_y(PO_4)_3F_{1-y-a}Cl_aO_y$$

wherein
w is from 0 to about 0.05
x is from 0.13 to about 0.17
y is from 0.02 to about 0.04
a is from about 0.02 to about 0.1,
and having a peak emission of from about 565 to about 575 nanometers and a 50% bandwidth of from about 60 to about 100 nanometers whereby said lamp yields higher lumens per watt than an equivalent standard white lamp.

2. A lamp according to claim 1 wherein in the blue emitting phosphor y is zero.

3. A lamp according to Claim 1 wherein in the blue emitting phosphor, y is greater than zero.

* * * * *